United States Patent
Brittain et al.

(10) Patent No.: US 6,900,262 B2
(45) Date of Patent: May 31, 2005

(54) SYNTHESIS AND CHARACTERIZATION OF NANOCOMPOSITES BY EMULSION POLYMERIZATION

(75) Inventors: William J. Brittain, Cuyahoga Falls, OH (US); Xinyu Huang, Akron, OH (US)

(73) Assignee: The University of Akron, Akron, OH (US)

( * ) Notice: Subject to any disclaimer, the term of this patent is extended or adjusted under 35 U.S.C. 154(b) by 77 days.

(21) Appl. No.: 10/381,961

(22) PCT Filed: Oct. 1, 2001

(86) PCT No.: PCT/US01/30836

§ 371 (c)(1),
(2), (4) Date: Aug. 21, 2003

(87) PCT Pub. No.: WO02/28911

PCT Pub. Date: Apr. 11, 2002

(65) Prior Publication Data

US 2004/0030022 A1 Feb. 12, 2004

Related U.S. Application Data

(60) Provisional application No. 60/237,268, filed on Oct. 2, 2000.

(51) Int. Cl.[7] .................................................. C08J 3/34
(52) U.S. Cl. .................... 524/445; 524/800; 524/815; 524/832; 524/836; 524/807; 524/560; 524/555; 524/567; 524/571
(58) Field of Search .............................. 524/800, 832, 524/836, 807, 815, 445, 560, 555, 567, 571

(56) References Cited

U.S. PATENT DOCUMENTS

| | | | |
|---|---|---|---|
| 3,271,355 A | 9/1966 | Vanderbilt et al. | 260/41.5 |
| 5,385,776 A | 1/1995 | Maxfield et al. | 428/297 |
| 5,514,734 A | 5/1996 | Maxfield et al. | 523/204 |
| 5,552,469 A | 9/1996 | Beall et al. | 524/445 |
| 5,578,672 A | 11/1996 | Beall et al. | 524/446 |
| 5,698,624 A | 12/1997 | Beall et al. | 524/445 |
| 5,721,306 A | 2/1998 | Tsipursky et al. | 524/449 |
| 5,760,121 A | 6/1998 | Beall et al. | 524/450 |
| 5,840,796 A | 11/1998 | Badesha et al. | 524/449 |
| 5,844,032 A | 12/1998 | Serrano et al. | 524/445 |
| 5,952,095 A | 9/1999 | Beall et al. | 428/332 |
| 6,017,632 A | 1/2000 | Pinnavaia et al. | 428/403 |
| 6,057,396 A | 5/2000 | Lan et al. | 524/445 |
| 6,096,803 A | 8/2000 | Pinnavaia et al. | 523/209 |
| 6,136,908 A | 10/2000 | Liao et al. | 524/445 |
| 6,242,526 B1 * | 6/2001 | Siddiqui et al. | 524/555 |
| 6,387,968 B1 | 5/2002 | Glück et al. | 521/56 |

FOREIGN PATENT DOCUMENTS

| | | | |
|---|---|---|---|
| DE | 14 69 979 A | | 4/1969 |
| DE | 198 12 856 A | | 9/1999 |

OTHER PUBLICATIONS

Lee et al. J. Appl. Polym. Sci. 1996, 61, 1117–1122.*

* cited by examiner

Primary Examiner—David W. Wu
Assistant Examiner—Rip A. Lee
(74) Attorney, Agent, or Firm—Roetzel & Andress

(57) ABSTRACT

The present invention generally provides a method for producing an exfoliated nanocomposite. The method involves charging to water, as the continuous phase, monomers, polymerizable surfactant, and water-soluble initiator. The monomers are allowed to polymerize under agitation to form an emulsion of polymers, and the polymerizable surfactant is bound to the polymers so formed, with an ionic end of the polymerizable surfactant extending from the polymers to provide surface charges. Thereafter, a suspension of nanofillers in water is charged to the emulsion. The nanofillers are oppositely charged from the ionic end of the polymerizable surfactant such that they electrostatically bind to the polymers within the emulsion. The water is subsequently decanted to produce a nanocomposite with an exfoliated structure.

19 Claims, 2 Drawing Sheets

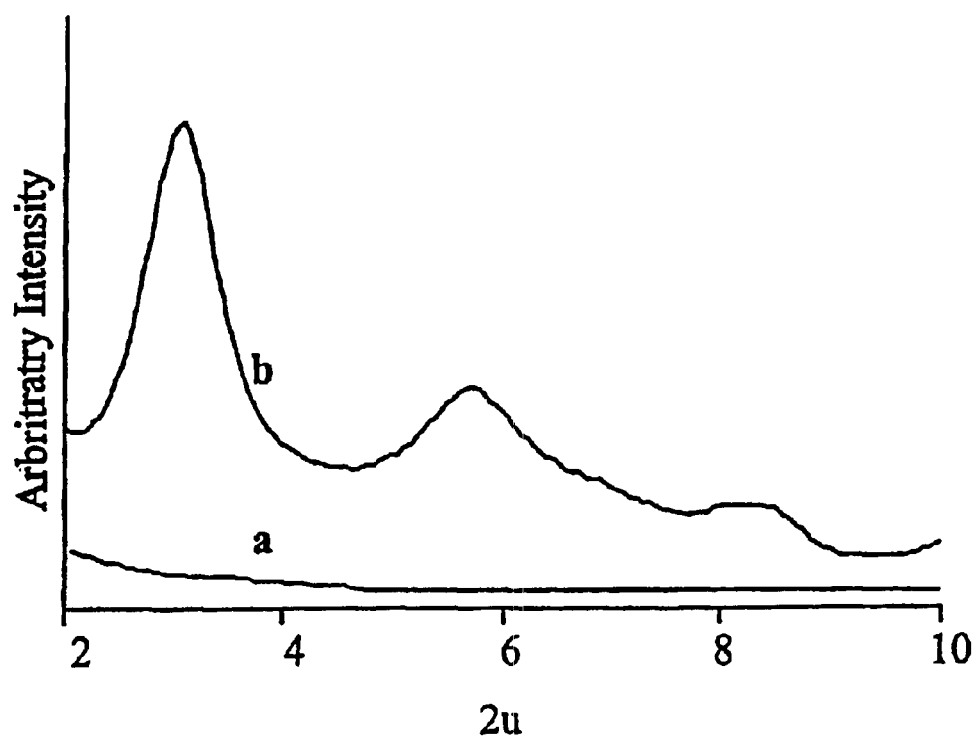
Figure 1. WAXD Analysis of: (a) Example 2, (b) Example 1.

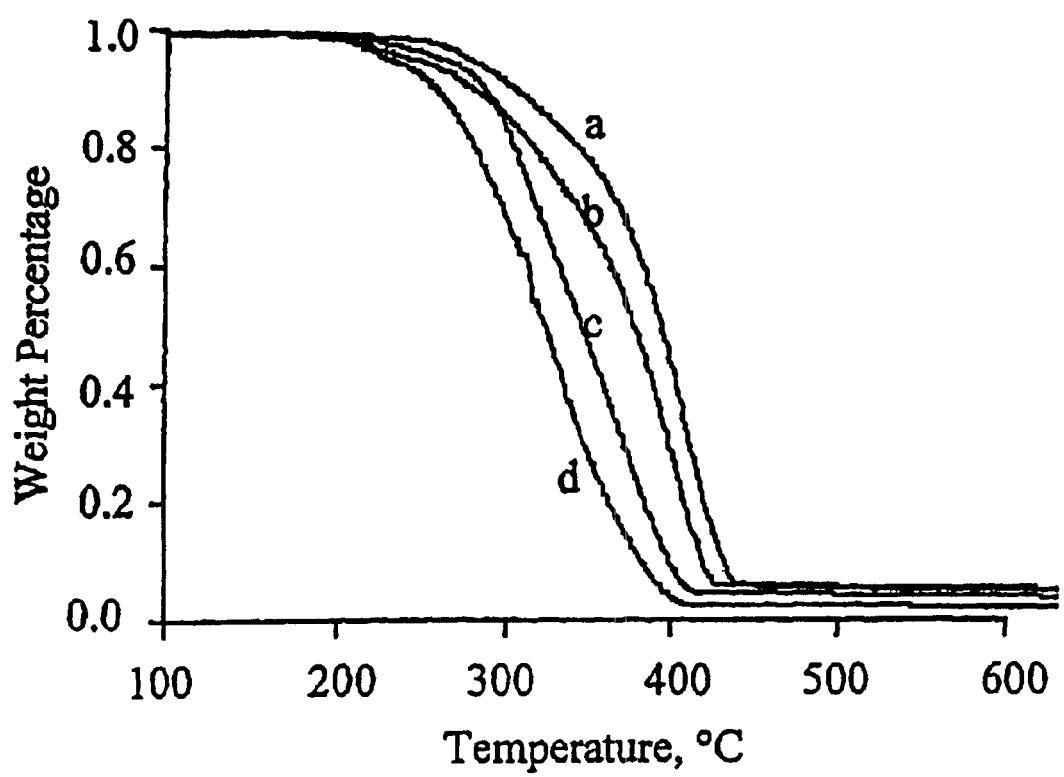
Figure 2. TGA Analysis of: (a) Example 2, (b) Example 1, (c) Example 3, (d) Control

SYNTHESIS AND CHARACTERIZATION OF NANOCOMPOSITES BY EMULSION POLYMERIZATION

This application gains priority from International Application No. PCT/US01/30836, filed on Oct. 1, 2001, which gains priority from U.S. application Ser. No. 60/237,268, filed on Oct. 2, 2000.

TECHNICAL FIELD

The present invention relates to nanocomposites of polymers and nanofillers prepared by in-situ emulsion polymerization. More particularly, the present invention focuses on providing polymer-layered nanocomposites that exhibit exfoliated structures that may be maintained during processing steps employed subsequent to nanocomposite formation. The emulsion polymerization disclosed herein advantageously introduces the nanofillers in a post polymerization step.

BACKGROUND OF THE INVENTION

Polymer-layered nanocomposites often exhibit physical and chemical properties that are dramatically different from conventional microcomposites. These polymer layered nanocomposites can exhibit increased modulus, decreased thermal expansion coefficients, reduced gas permeability, increased solvent resistance and enhanced ionic conductivity when compared to the polymers alone.

In general, two idealized polymer-layered nanocomposite structures are possible: intercalated and exfoliated. The greatest property enhancements are generally observed for exfoliated nanocomposites. These consist of individual nanometer-filler layers suspended in a polymer matrix. In contrast, intercalated hybrids consist of well ordered multi-layers with alternating polymer/nanometer-filler layers with a repeat distance of a few nanometers. In reality many systems fall short of the idealized exfoliated morphology. More commonly, partially exfoliated nanocomposites, containing small stacks of 2–4 nanometer-filler layers uniformly dispersed in the polymer medium, are obtained. Nevertheless, these systems may still exhibit substantial physical property enhancements.

Intercalated and exfoliated poly(methyl methacrylate) (PMMA) nanocomposites including nanometer-thick silicate layers dispersed throughout the polymer matrix have been studied in the prior art. PMMA is an important member in the family of polyacrylic and methacrylic esters. PMMA has several desirable properties, including exceptional optical clarity, good weatherability, high strength and excellent dimensional stability. PMMA nanocomposites offer the potential for reduced gas permeability, improved physical performance, and increased heat resistance, without a sacrifice in optical clarity.

The literature contains several reports on the interaction of PMMA and layered silicates. Biasci and co-workers, *F. Polymer* 1994, 35, 3296 obtained intercalated PMMA/clay hybrid structures by two methods: (1) polymerization of MMA with montmorillonite modified by 2-(N-methyl-N,N-diethylanunonium iodide)ethyl acrylate, and (2) direct interaction of MMA copolymers (which contained pendent ammonium groups) with an organically modified silicate. Chen and co-workers, *J. Mater. Sci. Lett.*, 1999, 18, 1761, and Okamoto and co-workers, *Polymers* 2000, 41, 3887, prepared partially exfoliated PMMA nanocomposites by the bulk polymerization of MMA in the presence of an organically modified silicate. Dietsche and co-workers, *PMSE Preprints* 2000, 82, 222, prepared an amidinium-functionalized PMMA ($M_n$=3200 g/mol) and used this material as an organic modifier for fluorohectorite. Effective exfoliation was observed using this oligomeric modifier in the bulk polymerization of MMA and MMA/comonomer mixtures. This result is consistent with the view that tethered polymer chains promote exfoliation.

At least two reports describe the preparation of PMMA/clay hybrids by emulsion polymerization of MMA. In both reports, the layered silicate is present during polymerization. Lee and Jang, *J.Appl. Polym. Sci.* 1996, 61, 1117, only observed intercalated structures. Recent work by Bandyopadhyay, Giannelis and Hsieh demonstrated formation of an exfoliated PMMA nanocomposite; a 6° C. increase in $T_g$ and a 50° C. increase in the decomposition temperature was reported for the PMMA nanocomposite.

Although considerable research has focused on providing PMMA nanocomposites, the emulsion polymerization process herein disclosed employs an experimental method heretofore unknown in that the nanocomposite is formed in a post polymerization step. Additionally, although the discussion above focused considerably on PMMA nanocomposites, the present invention will not be limited thereto. Rather, the present invention focuses on a method for creating a broad scope of polymer-layered nanocomposites, and may encompass the use of a multitude of different polymers and a multitude of different nanofillers. However, PMMA nanocomposites are provided in one preferred embodiment.

SUMMARY OF THE INVENTION

For purposes of the present disclosure, the term "nanometer-filler" is to be understood to describe virtually any type of filler having at least one dimension (i.e. length, width, height, radius, etc.) that is in the nanoscale (i.e. 1–999 nm). By the term "polymerizable surfactant" it is meant a surfactant that is polymerizable at at least one end thereof with a vinyl monomer whose polymerization has been initiated by a suitable initiator. Particularly, a "polymerizable surfactant" is to be capable of being covalently bound to the particular monomer or monomers with which it is being employed according to the present invention.

The present invention generally provides a method for producing an exfoliated nanocomposite. The method involves charging to water, as the continuous phase, monomers, polymerizable surfactant, and water-soluble initiator. The polymerizable surfactant has a non-polar end and an ionic end, the non-polar end being capable of being miscible with the monomer during polymerization of the monomer. The water-soluble initiator is selected to polymerize the monomers. The monomers are allowed to polymerize to form polymers, and the polymerizable surfactant is bound to the polymers so formed, with the ionic end of the polymerizable surfactant extending from the polymers to provide surface charges. The polymerization is carried out under suitable agitation to provide an emulsion of the polymers having the polymerizable surfactant bound thereto. Thereafter, a suspension of nanofillers in water is charged to the emulsion. The nanofillers are oppositely charged from the ionic end of the polymerizable surfactant such that they electrostatically bind to the polymers within the emulsion. The water is subsequently decanted to produce a nanocomposite with an exfoliated structure.

Notably, the attraction between the ionic end of the polymerizable surfactant and the oppositely charged nanofillers will typically preserve the exfoliated structure of the nanocomposite during melt processing thereof. Additionally, the method is advantageous in that the level of nanofillers within the nanocomposites produced can be easily adjusted by making a master batch of the polymer/polymerizable surfactant emulsion and adding different concentrations of suspended nanofillers in water. Furthermore, no prior modification of the nanofiller is necessary for nanocomposite formation. The formation of the nanocomposite can also beneficially be conducted at room temperature, which reduces the likelihood for decomposition as is sometimes encountered in melt intercalation methods.

BRIEF DESCRIPTION OF THE DRAWINGS

FIG. 1 is a graphical representation of WAXD analysis of PMMA nanocomposites prepared by emulsion polymerization; and FIG. 2 is a graphical representation of TGA traces of PMMA nanocomposites prepared by emulsion polymerization as well as a macrocomposite control.

PREFERRED EMBODIMENT FOR CARRYING OUT THE INVENTION

The method of the present invention provides exfoliated nanocomposites, wherein the exfoliated structures may be maintained during melt processing. Initially, monomers are dispersed in water with the aid of a polymerizable surfactant having a non-polar end and an ionic end. Particularly, the monomers are surrounded by the polymerizable surfactant to provide an emulsion of the monomers and polymerizable surfactant. An initiator is added to this emulsion to polymerize the monomer, and, because the surfactant is a polymerizable surfactant as defined above, the surfactant is incorporated into the polymers being produced, the polymerizable surfactant is bound to the polymerized monomers. The polymerizable surfactant is chosen to bind to the polymer at its non-polar end, such that the resultant polymers will include ionic groups extending from the polymer backbone. A nanometer-filler dispersed in water is added to the polymer emulsion. This nanometer-filler is chosen to have a charge opposite that which is provided by the polymerizable surfactant's ionic group. Thus, electrostatic forces cause the nanometer-filler to surround the polymers containing polymerizable surfactant bound thereto, thereby creating a nanocomposite dispersed throughout the water continuous phase. To obtain the final nanocomposite product, the water is decanted by centrifugation or another suitable method.

The monomers utilized in this invention may generally be selected from the family of vinyl monomers suitable for free radical polymerization under emulsion conditions. Non-limiting examples of suitable vinyl monomers include methacrylates, styrenes, vinyl chlorides, butadienes, isoprenes, and acrylonitriles.

Methylmethacrylate (MMA) monomers are preferred because poly(methyl methacrylate) (PMMA), which is provided upon the polymerization of the MMA monomers with the polymerizable surfactant initiator, has several desirable properties for optical applications, including exceptional optical clarity, good weatherability, high strength, and excellent dimensional stability.

The surfactants that are employed in this invention are "polymerizable surfactants" as defined above. That is, they must be capable of reacting with the monomers as they are polymerized by the initiator. Thus, the choice of a useful polymerizable surfactant is interrelated with the monomer and initiator that is selected. Additionally, the polymerizable surfactant must have a non-polar end and an ionic end, with the non-polar end being the portion of the polymerizable surfactant that binds to the monomer during polymerization. This is so because the exfoliated nanocomposites produce in this invention retain their exfoliated structure due to the fact that the ionic end of the polymerizable surfactant is electrostatically attracted to the nanometer-filler employed.

The polymerizable surfactant should be chosen such that its structure corresponds to the monomer structure to ensure that satisfactory copolymerization will occur between the monomer and surfactant. As the monomers selected for this invention are generally vinyl monomers, the polymerizable surfactants may generally be selected from amphoteric molecules that additionally possess a polymerizable moiety, such as an acrylate, styrenic, or other suitable functional group, with the understanding that the initiator can generally be selected from conventional emulsion initiators.

A preferred polymerizable surfactant for use in this invention, particularly in conjunction with the preferred MMA monomers, is [2-(methyacryloyloxy)ethyl] trimethylammonium chloride. This polymerizable surfactant has a non-polar end (characterized by the methacrylate) and an ionic end (characterized by the ammonium chloride group). In the presence of MMA monomer being polymerized by a suitable initiator, the surfactant will copolymerize with the monomer, and the ionic end will provide the resultant polymer with ionic side groups. These ionic groups can electrostatically attract a suitable nanometer-filler.

A preferred initiator in the present invention, especially when the above-preferred MMA monomers and [2-(methyacryloyloxy)ethyl] trimethylammonium chloride surfactant are employed, is MMA. This initiator is capable of polymerizing the MMA monomers, and will also react with the non-polar end of the aforementioned polymerizable surfactant. However, any initiator that is suitable for a conventional emulsion polymerization can be considered.

Nanofillers are generally well known. For purposes of the present disclosure, nanofillers are fillers having at least one dimension in the nanoscale (1–999 nm). Suitable fillers may include, without limitation, clay minerals, fibers, microspheres, and layered silicates. Notably, the nanofillers must either inherently provide charged surfaces that are opposite the charge provided by the ionic end of the polymerizable surfactant or must be caused to include such a charged surface. This charge ensures that the nanometer-filler is electrostatically attracted to the polymer produced by the interaction of the monomers, polymerizable surfactant, and initiator.

Non-limiting examples of useful layered silicates include montmorillonite and laponite.

Notably, some fibers and microspheres, may not have charged surfaces and, therefore, their surfaces must be modified by surface functionalization with ionic groups so as to be charged opposite the ionic end of the polymerizable surfactant employed.

Particularly preferred nanofillers, especially in conjunction with the preferred MMA monomers, [2-(methyacryloyloxy)ethyl] trimethylammonium chloride surfactant, and AIBA initiator, include montmorillonite and laponite. These clays fall within the broad category of layered silicates, and consist of silicate layers that are several nanometers thick. These clays also have net anionic surface charges that electrostatically interact with the cationic charges provided by the preferred polymerizable surfactant tethered to the PMMA polymer chain. This electrostatic attraction helps to ensure that the exfoliated structure of the nanocomposite produced is maintained even after melt processing.

Additional optional components may be present during the process of this invention. For instance, chain transfer agents, which are typical of free radical polymerizations, may be employed to facilitate the polymerization of the monomers and polymerizable surfactant. Other optional components that may facilitate the present process include colorants, mold-release agents, and other known modifiers.

In the method of this invention, the selected monomer and polymerizable surfactant are initially charged to a vessel containing water and are slightly agitated by stirring to provide an emulsion wherein the small monomer droplets are surrounded by the polymerizable surfactant. The monomer and surfactant are charged in a weight ratio of from about 300:1 to about 50:1, monomer:surfactant. The actual mix ratio selected will depend upon monomer reactivity ratios, the desired molecular weight, and the desired properties of the final product.

When the preferred MMA monomer and [2-(methyacryloyloxy)ethyl] trimethylammonium chloride surfactant are employed, the mix ratio preferably ranges from about 200:1 to 100:1, with a particularly preferred ratio being 120:1.

After the monomer emulsion is created, the properly selected initiator is added to the emulsion in a weight ratio (relative to monomer) 1:400 to about 1:100 depending upon the desired rate of polymerization. When the preferred MMA monomer and [2-(methyacryloyloxy)ethyl] trimethylammonium chloride surfactant are employed within the preferred mix ratios, the preferred AIBA initiator is added at this step in amount ranging from about 1:250 to about 1:150.

After polymerizaton, the nanometer-filler may be added. First, the nanometer-filler is preferably dispersed in water at a desired concentration. Thereafter, the water containing the nanometer-filler is added dropwise to the polymer emulsion produced according to the above steps. Addition of the nanometer-filler is made until the desired ratio of nanometer-filler to polymer (including surfactant bound thereto) is reached. Typically, the nanometer-filler is added in an amount such that the resultant end product nanocomposite includes from about 0.5 to about 10 weight percent (wt. %) nanometer-filler.

In the particularly preferred embodiment employing MMA monomer, [2-(methyacryloyloxy)ethyl] trimethylammonium chloride surfactant, and AIBA initiator, the preferred nanofillers are preferably added in an amount such that the resultant end-product nanocomposite contains from about 1 to about 5 wt. % montmorillonite and/or laponite.

The addition of the nanometer-filler creates a nanocomposite emulsified within the water. Upon removal of the water, the nanocomposite is obtained. Thus, the water is decanted by any suitable means such as, for example, centrifugation, settling, or filtration, although the present invention is not to limited thereto or thereby.

Notably, in the process of the present invention, the nanometer-filler is combined with the polymer emulsion at room temperature. This reduces the problem of degradation of filler modifier that is typically encountered during melt intercalation processes of the prior art. Additionally, the nanometer-filler loading can be varied simply by malting a master batch of the polymer emulsion and adding different concentrations of the nanometer-filler.

Compared to conventional macrocomposites, improved properties of nanocomposites of this invention may include: improved thermal properties (e.g., higher heat distrotion temperature), reduced flammability, decreased gas permeability and increased mechanical properties.

EXAMPLES

PMMA nanocomposites were prepared by emulsion polymerization, and exfoliated structures were obtained. The exfoliated structure remained stable during melt processing for samples prepared using [2-(methyacryloyloxy)ethyl] trimethylammonium chloride as a polymerizable surfactant. This surfactant produced tethered polymer chains, which is believed to be a key concept for the synthesis of thermodynamically stable, exfoliated nanocomposites. Unmodified silicate was added as the nanometer-filler in a post polymerization step, which has several practical advantages. TGA and DSC analysis showed significant improvements in the thermal properties of the PMMA nanocomposites. For the exfoliated PMMA nanocomposites, 5–15° C. increases in $T_g$ and up to 60° C. increases in decomposition temperatures were observed.

Materials

The layered silicates (montmorillonite and laponite) used in this study were supplied by Southern Clay Products. Methyl methacrylate (MMA) was purchased from Aldrich and was distilled from $CaH_2$. Other inorganic and organic materials were commercially available and used as received.

PMMA Macrocomposite for Comparison

The desired amount of PMMA powder and unmodified montmorillonite were mechanically mixed and heated to 180° C. under pressure. Properties for this macrocomposite, formed through melt intercalation, are provided in Table 1, under the "Control" example.

Example 1

PMMA-Layered Silicate Nanocomposite by Emulsion Polymerization: A mixture of 20 mL MMA and 100 mL distilled water was bubbled with argon for 1 h. 0.1 g of n-decyltrimethylammonium chloride and 0.094 g (0.5 wt. % based on MMA) of AIBA initiator were added. The polymerization was carried out at 80° C. for 12 h with stirring. After the temperature was decreased to 23° C., a suspension of layered silicate in distilled water was added dropwise into the emulsion. The resulting polymer composite was collected by centrifugation, the product was washed with distilled water and dried in vacuo at 60° C. overnight.

Examples 2 and 3

PMMA-Layered Silicate Nanocomposite by Emulsion Polymerization: A mixture of 20 mL MMA and 100 mL distilled water was bubbled with argon for 1 h. 0.15 g of [2-(methacryloyloxy)ethyl] trimethylammonium chloride and 0.094 g (0.5 wt. % based on MMA) of AIBA initiator were added. The polymerization was carried out at 80° C. for 12 h with stirring. After the temperature was decreased to 23° C., a suspension of layered silicate in distilled water was added dropwise into the emulsion. The resulting polymer composite was collected by centrifugation, the product was washed with distilled water and dried in vacuo at 60° C. overnight. This procedure was employed using both montmorillonite (Example 2) and laponite (Example 3) nanofillers (see Table 1).

Characterization and Methods

Melt pressing was performed using a hydraulic press; samples were treated at 180° C. for 10 min. Wide angle X-ray diffraction (WAXD) analysis was performed on Rigaku diffractometer equipped with a rotating-anode generator system using Cu-Ka radiation. Thermogravimetric analysis (TGA) was performed on a Hi-Res TGA 2950 Thermogravimetric Analyzer (TA instruments) over the temperature range of 23–800° C. at a rate of 20° C./min. Differential scanning calorimetry was performed on a DSC 2910 Differential Scanning Calorimeter (DuPont Instruments). Atomic Force Microscopy (AFM) was performed using an Autoprobe™ M5 (Park Scientific Instruments) under ambient conditions with a commercial Ultralever™ silicon probe and a V-shape cantilever. Molecular weight analysis was performed by gel permeation chromatography (GPC) with a Waters 510 pump, 2 PLgel (Polymer Laboratories) mixed D columns (5 u), and a Waters 410 differential refractometer. Molecular weights were calibrated by comparison to narrow MWD PMMA samples (Polymer Laboratories). Data analysis was performed with the E-Z Chrom software package.

TABLE 1

| Example | Nanofiller | $T_g$, ° C. | T, ° C. for 20% wt. Loss |
|---|---|---|---|
| Control | montmorillonite | 100 | 279 |
| Example 1 | montmorillonite | 111 | 314 |
| Example 2 | montmorillonite | 115 | 341 |
| Example 3 | laponite | 106 | 303 |

PMMA-Layered Silicate Nanocomposites by Emulsion Polymerization

The WAXD of the nanocomposites indicated an exfoliated structure before melt pressing. The nanocomposite of Example 1 did not preserve its exfoliated structure after melt pressing (FIG. 1); however, the exfoliated structure of the nanocomposite of Example 2 was preserved after melt pressing. The TGA analysis of these nanocomposites is shown in FIG. 2. The onset of thermal decomposition for the nanocomposites shifted to higher temperatures in FIG. 2; a summary of TGA and DSC data is given in Table 1.

Tethering of polymer chains to a layered silicate is a key concept for exfoliated structures that are thermodynamically stable. Polymer chains that are tethered to the silicate layers hinder the aggregation of the silicate layers and help preserve the exfoliated structure.

For the emulsion polymerization, the first step is exactly the same as conventional emulsion polymerization. The silicate (which is not organically modified) is added in a post polymerization step. Because the latex particles have cationic surface charges and the silicate layers have anionic charges, electrostatic forces promote an interaction between the silicate and polymer particles.

In Example 1, the nonfunctional cationic surfactant I is used in the emulsion polymerization did not preserve the exfoliated structure after melt processing (FIG. 1). However, in Example 2, the polymerizable surfactant used in the emulsion polymerization provided exfoliated PMMA nanocomposites that remained stable during melt processing; this nanocomposite displayed a 15° C. increase in $T_g$ and a 62° C. increase in the temperature for 20% weight loss.

Thus, this invention demonstrates a simple polymerization method for the formation of thermodynamically stable, exfoliated nanocomposites. Of particular interest are PMMA nanocomposites due to their potential to improve thermal properties without sacrificing optical properties. Montmorillonite nanofiller has the disadvantage of adding color to the sample. To overcome this problem, nanocomposites may be prepared with the synthetic clay, laponite. One difference between montmorillonite and laponite is the average size, which is 1000 nm for montmorillonite and 25 nm for laponite. Laponite PMMA nanocomposites retained good optical properties as deduced by visual observation, but the improvements in decomposition temperature and in $T_g$ were not as high as the montmorillonite nanocomposites, see Table 1.

The foregoing examples have been provided to demonstrate the practice of the present invention. These examples should not, however, limit the present invention. The following claims will serve to define its scope.

What is claimed is:

1. A process for producing exfoliated nanocomposites comprising the steps of:

emulsion polymerizing vinyl monomer in the presence of a surfactant to be polymerized therewith; and adding unmodified nanofiller in a post-polymerization step at room temperature.

2. The process of claim 1, wherein the vinyl monomer is selected from the group consisting of monomers based on methacrylates, monomers based on acrylates, vinyl chlorides, styrenes, butadienes, isoprenes, acrylonitriles, and combinations thereof.

3. The process of claim 2, wherein the vinyl monomer is methylmethacrylate.

4. The process of claim 1, wherein the polymerizable surfactant possesses one end that is charged and another end that is hydrophobic and has a vinyl functionality suitable for copolymerization.

5. The process of claim 4, wherein the polymerizable surfactant is [2-(methyacryloyloxy)ethyl] trimethylammonium chloride.

6. The process of claim 1, wherein the nanofiller is selected from the group consisting of layered silicates, fibers, micro-spheres, and combinations thereof.

7. The process of claim 6, wherein the nanofiller is unmodified montmorillonite.

8. The process of claim 6, wherein the nanofiller is unmodified laponite.

9. The process of claim 1, wherein said step of emulsion polymerizing is initiated by a suitable water-soluble initiator for emulsion polymerization.

10. The process of claim 9, wherein the water-soluble initiator is 2, 2'-azobis(isobutylamidine hydrochloride).

11. A method for producing a nanocomposite comprising the steps of:

charging to water, as the continuous phase, monomer, polymerizable surfactant, and water-soluble initiator, wherein the polymerizable surfactant has a non-polar end and an ionic end, the non-polar end being capable of being bound to the monomer during polymerization of the monomer, and the water-soluble initiator is selected to polymerize the monomer and incorporate the non-polar end of the polymerizable surfactant into polymers formed during polymerization of the monomer;

allowing the monomer to polymerize to form polymers, wherein the polymerizable surfactant is bound to the polymers so formed, with the ionic end of the polymerizable surfactant extending from the polymers, the polymerization being carried out with agitation to provide an emulsion of the polymers having a polymerizable surfactant bound thereto; and charging a suspension of nanofillers to the emulsion, wherein the nanofillers are oppositely charged from the ionic end of the polymerizable surfactant.

12. The method of claim 11, wherein the monomer is vinyl monomer selected from the group consisting of methacrylates, monomer based on acrylates, vinyl chlorides, styrenes, butadienes, isoprenes, acrylonitriles, and combinations thereof.

13. The method of claim 12, wherein the vinyl monomer is methyl methacrylate.

14. The method of claim 11, wherein the polymerizable surfactant possesses one end that is charged and another end that is hydrophobic and has a vinyl functionality suitable for polymerization.

15. The method of claim 14, wherein the polymerizable surfactant is [2-(methyacryloyloxy)ethyl] trimethylammonium chloride.

16. The method of claim 11, wherein the nanofiller is selected from the group consisting of layered silicates, fibers, and combinations thereof.

17. The method of claim 16, wherein the nanofiller is unmodified montmorillonite.

18. The method of claim 16, wherein the nanofiller is unmodified laponite.

19. The method of claim 11, wherein the water-soluble initiator is 2, 2'-azobis(isobutylamidine hydrochloride).

* * * * *